No. 655,550. Patented Aug. 7, 1900.
T. G. FOSTER.
SNAP HOOK.
(Application filed Feb. 11, 1899. Renewed June 22, 1900.)
(No Model.)

Witnesses.
H. Dennison.
A. W. McAdam.

Inventor:
T. G. Foster.
by Fetherstonhaugh & Co.
Attys.

UNITED STATES PATENT OFFICE.

THOMAS GEORGE FOSTER, OF PETERBOROUGH, CANADA.

SNAP-HOOK.

SPECIFICATION forming part of Letters Patent No. 655,550, dated August 7, 1900.

Application filed February 11, 1899. Renewed June 22, 1900. Serial No. 21,230. (No model.)

*To all whom it may concern:*

Be it known that I, THOMAS GEORGE FOSTER, manufacturer, of the town of Peterborough, in the county of Peterborough, in the Province of Ontario, Canada, have invented certain new and useful Improvements in Snap-Hooks, of which the following is a specification.

My invention relates to improvements in snap-hooks; and the object of the invention is to design a simple, cheap, durable, and safe snap-hook adaptable for various purposes; and it consists, essentially, of a snap-hook having a loop-shank, a cross-bar, and center pin, and a hook formed preferably of ribbon-steel pivotally supported on the center pin and having the free end of the hook provided with an offset whereby it may be held securely in position when closed by the cross-bar of the shank, and yet may be readily freed from such cross-bar by pressing upon the main body of the hook, so as to release the ring, eye, or other portion to which the hook is connected, as hereinafter more particularly explained.

Figure 1:
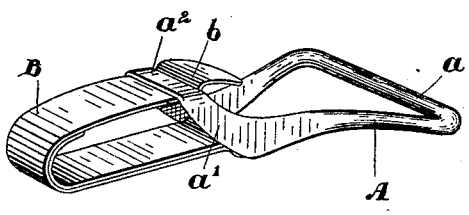
Figure 2:
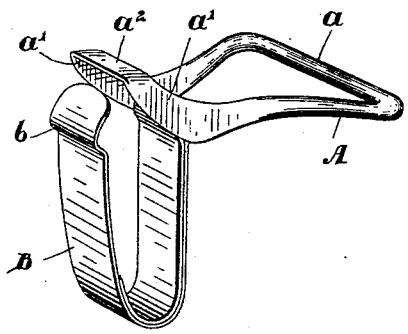
Figure 3:
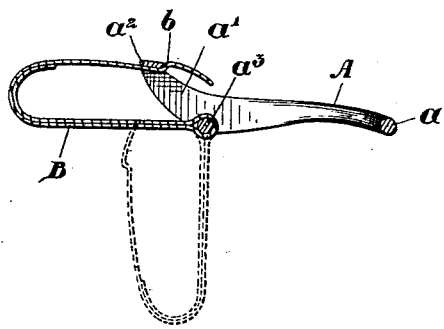

Figure 1 is a perspective view of my improved snap-hook, showing it closed. Fig. 2 is a view showing it open. Fig. 3 is a longitudinal section showing it in full lines closed and in dotted lines open.

In the drawings like letters of reference indicate corresponding parts in each figure.

A is the shank of the hook, which is formed with an end cross-bar $a$, to which the strap is connected, and curvulate forward extensions $a'$, connected together by a cross-bar $a^2$. The bottom of the curvulate extensions are connected together by a center pin $a^3$, preferably cast with the rest of the shank.

B is the hook, which is formed of a double piece of ribbon-steel doubled around the center pin and curved around the end of the hook, thereby forming a leaf to the hook, which serves to strengthen the spring at the free end of the hook and also receive the wear from the article grasped.

It will be noticed that the two leaves of the spring are bent, so as to closely encircle the center pin $a^3$. The free end of the hook B is provided with an offset forming a shoulder $b$ and is preferably curved to the end, as shown, so as to be within the curve of the arc of the free end of the hook.

The free end of the hook is adapted to be pressed beneath the cross-bar $a^2$, so that the shoulder $b$ will engage said bar and prevent the end of said hook from being drawn from beneath the bar and the hook swung on its pivot.

By pressing upon the outer end of the hook on the opposite side to the pivot-point the hook may be released, and by pressing on the opposite side, when in the position shown in Fig. 2, the hook may be thrown back into the position shown in this figure, and also as shown in Fig. 3. When the ring or article grasped by the end of the hook is inserted when the hook is open, as shown in full lines in Fig. 2 and dotted lines in Fig. 3, it will be understood that when closed, as shown in full lines in Fig. 1 and Fig. 3, the strain upon the hook will be practically on a line with the center pin and end bar of the shank, thereby preventing any tendency whatsoever of the shoulder $b$ becoming disengaged from the cross-bar $a^2$.

It will be seen from this description that a snap-hook such as I describe is very simple and very cheap and necessarily safe and durable, as will be understood from what has been hereinbefore described.

What I claim as my invention is—

1. A snap-hook comprising the shank A, a center pin $a^3$ and cross-bar $a^2$ and a hook formed of a flat spring pivoted on said pin $a^3$, the free end of said hook being adapted to rest beneath the flat under face of the cross-bar $a^2$, substantially as described.

2. A snap-hook comprising the shank having a center pin, and an upwardly-curved portion terminating in a flat cross-bar and a hook formed of a flat spring having a portion bent around said center pin and back upon itself to provide a reinforce, the end of the hook being adapted to rest beneath the flat face of the cross-piece, substantially as described.

THOMAS GEORGE FOSTER.

Witnesses:
B. BOYD,
WALTER H. ARMS.